3,513,234
Patented May 19, 1970

3,513,234
METHOD AND COMPOSITION FOR CONTROLLING MICROORGANISMS WITH TETRAHYDRO-1,3,5-THIADIAZINE-2-THIONES
Walter Traber, Riehen, Switzerland, assignor to Geigy Chemical Corporation, Greenburgh, N.Y., a corporation of Delaware
No Drawing. Original application Dec. 27, 1966, Ser. No. 604,641. Divided and this application Mar. 6, 1969, Ser. No. 831,798
Claims priority, application Switzerland, Dec. 29, 1965, 18,026/65
Int. Cl. A01n 9/12; A01k 29/00; A01l 13/00
U.S. Cl. 424—246       5 Claims

ABSTRACT OF THE DISCLOSURE

Tetrahydro-1,3,5-thiadiazine-2-thiones of the formula

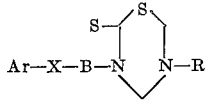

wherein Ar represents an unsubstituted or substituted aromatic radical, B represents a lower aliphatic bridging member having 2 or 3 chain members, R represents an aliphatic hydrocarbon which is unsubstituted or substituted by a hydrophilic group, and X represents oxygen, sulphur, sulphinyl or sulphonyl, which are useful as agents for controlling bacteria and fungi, compositions containing them and organic materials and articles of manufacture protected by these agents and compositions against attack by bacetria or fungi.

---

This application is a divisional of Ser. No. 604,641, filed Dec. 27, 1966.

The present invention relates to new tetrahydro-1,3,5-thiadiazine-2-thiones having valuable microbicidal properties, processes for the production of these new compounds and also microbicidal compositions which contain these tetrahydro-1,3,5-thiadizines as active substances. It also relates to methods for controlling microorganisms and more especially fungi and bacteria, and for the protection of organic materials and articles of manufacture from attack by microorganisms using such tetrahydro-1,3,5-thiadiazine-2-thiones or compositions containing these compounds; and finally it relates to the materials and articles protected by the novel compounds against deterioration or destruction by fungi or bacteria.

In a first aspect the invention provides for the novel tetrahydro-1,3,5-thiadiazine-2-thiones of the general Formula I

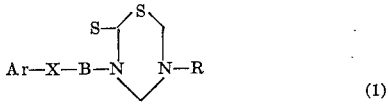

wherein Ar represents an unsubstituted or substituted aromatic radical, especially unsubstituted phenyl or phenyl substituted as defined more in detail further below, B represents a lower aliphatic bridging member having 2 or 3 chain members, R represents an aliphatic hydrocarbon radical which is unsubstituted or substituted by a hydrophilic group, especially as defined hereinafter, X represents oxygen, sulphur, the sulphinyl or sulphonyl group, which compounds possess valuable microbicidal properties, namely, fungicidal, bacteriostatic, fungistatic and particularly bactericidal activity. Their toxicity is slight. Thus, and because of their substantial colourlessness, and the lack of irritant action on the human skin and mucous membranes, the new compounds can be used for the most varied purposes such as for the protection of organic materials and articles of manufacture susceptible to injury and destruction by microorganisms, also as disinfectant additives to cosmetic and hygienic compositions such as soaps and other cleansing compositions. In addition the new tetrahydro-1,3,5-thiadiazine-2-thiones are suitable as fungicides in plant protection.

Other aspects of the invention, therefore, provide for compositions for controlling microorganisms which comprise microbicidally effective amounts of a component falling under general Formula I and a carrier which is compatible with the latter and with use of such compositions for the protection of organic materials and articles of manufacture susceptible to the attack of microorganisms, especially bacteria and fungi; as well as for methods for such control and protection and for the aforesaid materials and articles of manufacture protected by effective amounts of a compound of general Formula I or a composition containing the latter.

The lower aliphatic bridging member B in general Formula I is mainly a divalent aliphatic hydrocarbon radical of at most 4 carbon atoms, preferably a $-(CH_2)_n-$ group wherein $n$ is 2 or 3; it is in particular the ethylene group. Substituted phenyl radicals under Ar in general Formula I can contain one or more substituents, e.g. non-inorganic substituents such as halogen of an atomic number of at most 35, particularly chlorine and bromine, halogenoalkyl, preferably trifluoromethyl, lower alkyl such as methyl, ethyl, propyl, and butyl.

By an aliphatic hydrocarbon radical R is meant in particular a lower alkyl radical such as the methyl, ethyl, a propyl or butyl radical or a lower alkenyl radical such as the allyl or methallyl radical, which radicals can contain as hydrophilic substituents e.g. a substituent which forms anions such as the carboxyl group or a group which does not dissociate in water such as the hydroxyl group.

The new tetrahydro-1,3,5-thiadiazine-2-thiones of general Formula I are produced according to the present invention by reacting a salt of a dithiocarbamic acid of general Formula II

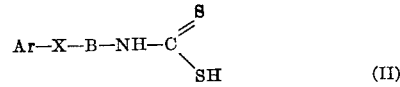

wherein Ar, B and X have the meanings given in Formula I, in any order desired with 2 molecules of mormaldehyde and with 1 molecule of a primary amine of the general Formula III $$RNH_2 \qquad (III)$$

wherein R has the meanings given in Formula I, preferably however, with an addition salt of such an amine with an inorganic or organic acid. As salts of dithiocarbamic acids of Formula II, the alkali or alkaline earth salts or the salts of a teritary amine are used for example.

According to a variation of this process, the salts of the dithiocarbamic acid are first converted into the free acid which is then reacted with formaldehyde and an amine of Formula III.

The processes described are preferably performed in the presence of a solvent which is inert to the reaction partners, particularly in the presence of water.

The salts of dithiocarbamic acid of general Formula II are produced by reacting amines of the general Formula IV

wherein Ar, B and X have the meanings given in Formula I, preferably β-phenoxy- and β-phenylthio- ethylamines, with carbon disulphide in the presence of a base such as alkali or alkaline earth metal hydroxides, alkali carbonates, or a tertiary amine.

In the process according to the invention the following amines can be used: methylamine, ethylamine, n-propylamine, isopropylamine, n-butylamine, isobutylamine, sec. butylamine, tert. butylamine, allylamine, ethanolamine, propanolamine, α-aminoacetic acid, β-aminopropionic acid, γ-aminobutyric acid. The amines of general Formula III are preferably used in the reaction in the form of their neutral salts, e.g. their hydrochlorides, sulphates, phosphates, acetates, etc.

The production of tetrahydro-1,3,5-thiadiazine-2-thiones symmetrically or unsymmetrically substituted in the 3,5-position is known [cf. DAS 1,15,24, DAS 1,14,14, A. Reiche et al., Arch Pharm. 296 (1963), pp. 641 and 70]. Up to the present however, no unsymmetrically substituted tetrahydro-1,3,5-thiadiazine-2-thiones have been described which contain an aryloxy-alkyl, arylthioalkyl, arylsulphoxyalkyl or arylsulphonylalkyl radical in the 3-position and which contain an aliphatic radical in the 5-position.

In the agar incorporation test according to Leonard and Blackford J. Bact. 57,339 (1949), which involves testing the growth of bacteria and fungi on agar in which the active substances in various concentrations have been incorporated, the tetrahydro - 1,3,5 - thiadiazine-2-thiones of general Formula I have an excellent growth-inhibiting action on microorganisms such as bacteria, namely, gram-positive as well as gram-negative bacteria, and fungi, e.g. *Aspergillus niger, Penicillium italicum, Fusarium oxysporum, Candida albicans*, Acrostalagmus spec., etc.; they are, therefore, particularly suitable for the protection or organic materials of all types from destruction and injury by bacteria and fungi. Also, because of their low toxicity, the active substances according to the invention can be used in hygiene and cosmetics. For the protection of organic materials the active substances of general Formula I are either incorporated into the material to be protected, or the material is impregnated with solutions or dispersions of the active ingredient. In this way, keratin materials such as skins, leather, wool, and also cellulosic materials such as wood, cellulose, paper, cotton, also compositions such as glues, printing thickeners made from starch and cellulose derivatives, oils of all types, processing liquors for paper and textiles, plastics and synthetic materials of all types, can be protected from attack by such microorganisms.

For hygiene and cosmetics, the active substances according to the invention are incorporated into cleansing agents such as soaps and in cosmetics such as ointments, creams or deodorants. Solutions for the impregnation of susceptible material are prepared, particularly, with organic solvents such as petroleum fractions, alcohols or ethers such as ethylene glycol alkyl ether. Surfactants such as emulsifying agents and other distributing agents can be added to these compositions for the protection of material susceptible to attack by microorganisms, whereby dispersions suitable for impregnation of the said material are obtained. Such solutions or dispersions should have a content of active substance of at least 0.1 g./litre.

In all forms for application, whether intended for technical, cosmetic or hygienic purposes, the active substances of general Formula I can be used alone or together with other known microbicidal active substances compatible therewith.

They can be combined, for example, with halogenated salicylic acid alkylamides and anilides, with halogenated diphenyl ureas, with halogenated benzoxazoles or benzoxazolones, with polychloro-hydroxydiphenyl methanes, with halogen-dihydroxydiphenyl sulphides, with halogenated hydroxydiphenyl ethers, with 2-imino-imidazolidines or -tetrahydropyrimidines or with quaternary compounds or with certain dithiocarbamic acid derivatives such as tetramethyl thiuram disulphide. Optionally, also carriers which themselves have a desirable microorganism-controlling action such as sulphur or zinc stearate, can be used as a foundation for powders or as component of ointment foundations, respectively.

The following non-limitative examples illustrate the invention further. Where not otherwise stated, parts and percentages are given by weight. The temperatures are in degrees centigrade.

EXAMPLE 1

9.5 parts of isopropylamino hydrochloride and 16.7 parts of an aqueous-formaldehyde solution having a concentration of about 36% by polume, are added to a solution of sodium N-β-phenoxyethyl dithiocarbamate which is produced from 10.6 parts of sodium carbonate, 13.7 parts of β-phenoxyethylamine and 7.6 parts of carbon disulphite, in 1000 parts of water. The milky white reaction mixture is stirred for 12 hours at room temperature (25°). The precipitate which is crystalline is isolated, dried in vacuo and recrystallised from methanol. The resulting 3 - (β-phenoxyethyl)-5-isopropyl-tetrahydro-1,3,5-thiadiazine-2-thione melts at 82–87°.

On using equimolar amounts of corresponding starting materials in the manner described in Example 1, dithiocarbamates of Formula II are produced and these are reacted with formaldehyde and the hydrolchloride of the corresponding amine of Formula III to form new tetrahydro-1,3,5-thiadiazine-2-thiones which are listed below:

| Ex. No. | Compound | Melting point, degrees |
|---|---|---|
| 2 | 3-(β-phenoxyethyl)-5-methyl-tetrahydro-1,3,5-thiadiazine-2-thione. | 90–92 |
| 3 | 3-(β-phenoxyethyl)-5-ethyl-tetrahydro-1,3,5-thiadiazine-2-thione. | 82–84 |
| 4 | 3-(β-phenylthioethyl)-5-methyl-tetrahydro-1,3,5-thiadiazine-2-thione. | 145–146 |
| 5 | 3-(β-phenoxyethyl)-5-carboxymethyl-tetrahydro-1,3,5-thiadiazine-2-thione. | 113–114 |
| 6 | 3-[β-(2'-chlorophenoxy)-ethyl]-5-methyl-tetrahydro-1,3,5-thiadiazine-2-thione. | 165–166 |
| 7 | 3-[β-(2'-chlorophenoxy)-ethyl]-5-ethyl-tetrahydro-1,3,5-thiadiazine-2-thione. | 117–118 |
| 8 | 3-[β-(2'-chlorophenoxy)-ethyl]-5-isopropyl-tetrahydro-1,3,5-thiadiazine-2-thione. | 84–85 |
| 9 | 3-[β-(2'-chlorophenoxy)-ethyl]-5-(β'-hydroxyethyl)-tetrahydro-1,3,5-thiadiazine-2-thione. | 136–137 |
| 10 | 3-[β-(2'-chlorophenoxy)-ethyl]-5-carboxymethyl-tetrahydro-1,3,5-thiadiazine-2-thione. | 135 |
| 11 | 3-[β-(4'-chlorophenoxy)-ethyl]-5-methyl-tetrahydro-1,3,5-thiadiazine-2-thione. | 119–120 |
| 12 | 3-[β-(4'-chlorophenoxy)-ethyl]-5-ethyl-tetrahydro-1,3,5-thiadiazine-2-thione. | 157–158 |
| 13 | 3-[β-(4'-chlorophenoxy)-ethyl]-5-isopropyl-tetrahydro-1,3,5-thiadiazine-2-thione. | 108–109 |
| 14 | 3-[β-(4'-chlorophenoxy)-ethyl]-5-(β'-hydroxy-ethyl)-tetrahydro-1,3,5-thiadiazine-2-thione. | 117 |
| 15 | 3-[β-(4'-chlorophenylthio)-ethyl]-5-methyl-tetrahydro-1,3,5-thiadiazine-2-thione. | 126 |
| 16 | 3-[β-(4'-chlorophenylthio)-ethyl]-5-(β'-hydroxy-ethyl)-tetrahydro-1,3,5-thiadiazine-2-thione. | 107 |
| 17 | 3-[β-(2',4'-dichlorophenoxy)-ethyl]-5-methyl-tetrahydro-1,3,5-thiadiazine-2-thione. | 192 |
| 18 | 3-[β-(2',4'-dichlorophenoxy)-ethyl]-5-ethyl-tetrahydro-1,3,5-thiadiazine-2-thione. | 132–133 |
| 19 | 3-[β-(2',4'-dichlorophenoxy)-ethyl]-5-isopropyl-tetrahydro-1,3,5-thiadiazine-2-thions. | 128–130 |
| 20 | 3-[β-(2',4'-dichlorophenoxy)-ethyl]-5-(β'-hydroxyethyl)-tetrahydro-1,3,5-thiadiazine-1-thione. | 135 |
| 21 | 3-[β-(3',4'-dichlorophenoxy)-ethyl]-5-methyl-tetrahydro-1,3,5-thiadiazine-2-thione. | 153–154 |
| 22 | 3-[β-(3',4'-dichlorophenoxy)-ethyl]-5-ethyl-tetrahydro-1,3,5-thiadiazine-2-thione. | 122 |
| 23 | 3-[β-(3',4'-dichlorophenoxy)-ethyl]-5-isopropyl-tetrahydro-1,3,5-thiadiazine-2-thione. | 127 |
| 24 | 3-[β-(3'-trifluoromethyl-4'-chlorophenylthio)-ethyl]-5-methyl-tetrahydro-1,3,5-thiadiazine-2-thione. | 140 |
| 25 | 3-[β-(3'-trifluoromethyl-4'-chlorophenylthio)-ethyl]-5-(β'-hydroxyethyl)-tetrahydro-1,3,5-thiadiazine-2-thione. | 119 |
| 26 | 3-[β-(4'-methylphenylthio)-ethyl]-5-(β'-hydroxy-ethyl)-tetrahydro-1,3,5-thiadiazine-2-thione. | 91–93 |
| 27 | 3-[β-(4'-chlorophenylthio)-ethyl]-5-(β'-carboxy-ethyl)-tetrahydro-1,3,5-thiadiazine-2-thione. | 153–154 |
| 28 | 3-[β-(4'-bromophenylthio)-ethyl]-5-n-butyl-tetrahydro-1,3,5-thiadiazine-2-thione. | ---------- |
| 29 | 3-[β-(4'-bromophenylthio)-ethyl]-5-allyl-tetrahydro-1,3,5-thiadiazine-2-thione. | ---------- |
| 30 | 3-(γ-phenoxypropyl)-5-methyl-tetrahydro-1,3,5-thiadiazine-2-thione. | ---------- |
| 31 | 3-[γ-(4'-chlorophenoxy)-propyl]-5-methyl-tetrahydro-1,3,5-thiadiazine-2-thione. | ---------- |
| 32 | 3-[γ-(4'-bromophenoxy)-propyl]-5-methyl-tetrahydro-1,3,5-thiadiazine-2-thione. | ---------- |
| 33 | 3-[γ-(4'-n-butylphenoxy)-propyl]-5-methyl-tetrahydro-1,3,5-thiadiazine-2-thione. | ---------- |
| 34 | 3-(β-phenylsulphinylethyl)-5-methyl-tetrahydro-1,3,5-thiadiazine-2-thione. | ---------- |
| 35 | 3-[β-(3'-trifluoromethyl-4'-chlorophenylsulphinyl)-ethyl]-5-(β'-hydroxyethyl)-tetrahydro-1,3,5-thiadiazine-2-thione. | ---------- |
| 36 | 3-[β-(2',4'-dichlorophenylsulphonyl)-ethyl]-5-isopropyl-tetrahydro-1,3,5-thiadiazine-2-thione. | ---------- |
| 37 | 3-[β-(4'-methylphenylsulphonyl)-ethyl]-5-(β'-hydroxy-ethyl)-tetrahydro-1,3,5-thiadiazine-2-thione. | ---------- |

The microbicidal (antimicrobial) action of compounds according to the invention was determined in the following test series and their range of activity is shown in the following table.

(1) The bactericidal action was tested on the following strains of bacteria: *Staphylococcus auraus* SG 511, *Bacilus pumilus*, *Sarcina ureae*.

As test method the "agar incorporation test" according to Leonard and Blackford was used: Nutrient agar plates with 100, 30, 10 and 3 p.p.m. of active substance (p.p.m. means part of active substance per $10^6$ parts diluent) were inoculated with solutions of the above mentioned bacterial strains and then incubated for 2 times 24 hours at 37°. The following table shows the minimum concentrations which inhibit the growth of the individual strains:

| Compound | Staph. aureus SG 511 | Bac. pumilus | Sar. ureae |
|---|---|---|---|
| 3-(β-phenoxyethyl)-5-isopropyltetrahydro-1,3,5-thiadiazine-2-thione | 30 | 30 | 100 |
| 3-[β-(4'-chlorophenoxy)-ethyl]-5-methyl-tetrahydro-1,3,5-thiadiazine-2-thione | 30 | 30 | 100 |
| 3-[β-(2'-chlorophenoxy)-ethyl]-5-isopropyl-tetrahydro-1,3,5-thiadiazine-2-thione | 30 | 100 | 30 |
| 3-[β-(2'-chlorophenoxy)-ethyl]-5-(β-hydroxyethyl)-tetrahydro-1,3,5-thiadiazine-2-thione | 10 | 30 | 100 |
| 3-[β-(2'-chlorophenoxy)-ethyl]-5-carboxymethyl-tetrahydro-1,3,5-thiadiazine-2-thione | 30 | 30 | 30 |
| 3-(β-phenyl-thioethyl)-5-methyl-tetrahydro-1,3,5-thiadizaine-2-thione | 30 | 30 | 100 |
| 3-[β-(4'-chlorophenyl)-thioethyl]-5-(β'-hydroxyethyl)-tetrahydro-1,3,5-thiadiazine-2-thione | 10 | 30 | 100 |
| 3-[β-(4'-chlorophenyl)-thioethyl]-5-(β'-carboxyethyl)-tetrahydro-1,3,5-thiadiazine-2-thione | 10 | 30 | 100 |

(2) The fungicidal action was tested on the following strains of fungi: *Aspergillus niger*, *Penicillium italicum*, *Fusarium oxysporum*, *Candida albicans*, Acrostalagmus spec.

The "agar incorporation test" according to Leonard and Blackford was used as test method. Nutrient agar plates with 100, 30, 10 and 3 p.p.m. of active substance are inoculated with solutions of the above mentioned fungal strains and incubated for 3 times 24 hours at 28°. The minimum concentrations which inhibit the growth of the individual strains are given in the following table

| Compound | Asp. niger | Pen. italicum | Fus. oxy. sporum | Cand. albicans | Acr. spec. |
|---|---|---|---|---|---|
| 3-(β-phenoxyethyl)-5-isopropyl-tetrahydro-1,3,5-thiadiazine-2-thione | 30 | 3 | 30 | 30 | 3 |
| 3-[β-(4'-chlorophenoxy)-ethyl]-5-methyl-tetrahydro-1,3,5-thiadiazine-2-thione | 100 | 10 | 30 | 30 | 30 |
| 3-[β-(2'-chlorophenoxy)-ethyl]-5-isopropyl-tetrahydro-1,3,5-thiadiazine-2-thione | 100 | 10 | 30 | 30 | 30 |
| 3-[β-(2'-chlorophenoxy)-ethyl]-5-(β'-hydroxyethyl)-tetrahydro-1,3,5-thiadiazine-2-thione | 100 | 30 | 30 | 30 | 100 |
| 3-[β-(2'-chlorophenoxy)-ethyl]-5-carboxymethyl-tetrahydro-1,3,5-thiadiazine-2-thione | 100 | 10 | 30 | 30 | 10 |
| 3-(β-phenylthioethyl)-5-methyl-tetrahydro-1,3,5-thiadiazine-2-thione | 100 | 10 | 30 | 30 | 10 |
| 3-[β-(4'-chlorophenyl)-thioethyl]-5-(β'-hydroxyethyl)-tetrahydro-1,3,5-thiadiazine-2-thione | >100 | 10 | 30 | 100 | 3 |
| 3-[β-(4'-chlorophenyl)-thioethyl]-5-(β'-carboxyethyl)-tetrahydro-1,3,5-thiadiazine-2-thione | >100 | 30 | 30 | 30 | 30 |

The following non-limitative examples describe the production of various forms suitable for application in practice. The parts and percentages are given therein by weight.

EXAMPLE 38

5 parts of 3-[β-(4'-chlorophenoxy)-ethyl]-5-(β'-hydroxyethyl)-tetrahydro-1,3,5-thiadiazine-2-thione are dissolved in a solution consisting of 50 parts of dimethyl formamide and 50 parts of ethylene glycol monomethyl ether. 5000 parts of a dispersion colour having a white pigment having a basis of copolymeric polyvinyl acetate as binder and about 50% solid content are added to this solution. The ready-for-use paint obtained, which contains 0.1% of active substance, is proof against attack by bacteria.

EXAMPLE 39

A soap is produced by mixing the following components:

76–76.5 parts of tallow soap,
0.5–1 parts of active substance, e.g. 3-(β-phenoxyethyl)-5-methyl-tetrahydro-1,3,5-thiadiazine-2-thione,
15.000 parts of coconut oil soap or palm oil soap,
0.010 part of free alkali (calculated as $Na_2O$),
6.065 parts of water,
1.000 part of perfume,
0.200 part of optical brightener,
0.050 part of dyestuff,
0.125 part of titanium white,
0.050 part of Sequestrene ST (sodium ethylenediaminetetraacetate,
0.500 part of glycerol.

The resulting soap has a microbicidal activity.

EXAMPLE 40

0.5 part of 3-[β-(4'-chlorophenoxy)-ethyl]-5-methyl-tetrahydro-1,3,5-thiadiazine-2-thione is dissolved in 5 parts of dimethylsulphoxide and a little ethanol. This solution is diluted with 3000 parts of water which contains about 2 parts of Turkish red oil as emulsifier and 100 parts of wool slubbing are treated in this liquor for 15 minutes at 60°. 5 parts of 10% acetic acid are added and the treatment at 60° is continued for another hour. The wool is then rinsed in the usual way and dried. On being tested, the wool is found to be resistant to attack by bacteria and fungi.

EXAMPLE 41

The following process, for example, can be used for the application of 3-[β-(4'-chlorophenylthio)-ethyl]-5-methyltetrahydro-1,3,5-thiadiazine-2-thione.

0.5 part of active ingredient is dissolved in 10 parts of dimethyl formamide and the solution is poured into 3000 parts of water which contains about 1–2 parts of an emulsifying agent, e.g. sulfonated castor oil.

100 parts of wool are treated in this liquor for 30 minutes at the boil. After rinsing and drying, the wool is found to be resistant to attack by bacteria and fungi.

Naturally, in the treatment baths in Examples 40 and 41, other auxiliaries as well as dyestuffs can be added.

EXAMPLE 42

First a 20% solution of 3-(β-phenylthioethyl)-5-methyl-tetrahydro-1,3,5-thiadiazine-2-thione in dimethyl sulphoxide is prepared. 10 parts by volume of this solution are diluted with 200 parts by volume of a solvent suitable for dry cleaning, e.g. a suitable benzine fraction ("Diluan S"). If desired, cleansing additives can be added. Woollen articles are then treated in this cleaning liquid in the usual way and then squeezed out to a content of solvent of about 100% of the weight of the wool. After drying, they are found to be resistant to attack by bacteria and fungi.

I claim:
1. A composition for controlling microorganisms selected from the group consisting of bacteria and fungi, which comprises a microbicidally effective amount of a compound of the formula

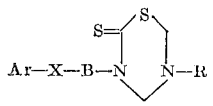

wherein Ar represents phenyl or substituted phenyl the substituents selected from the group consisting of alkyl, halogen and halogenoalkyl in which the alkyl has from 1 to 4 carbon atoms and the halogen is fluorine, chlorine or bromine, B represents alkylene of from 2 to 4 carbon atoms R represents alkyl having from 1 to 4 carbon atoms, alkenyl having 3 or 4 carbon atoms, or hydrophilically substituted alkyl wherein the hydrophilic groups are hydroxy or carboxyl and X represents oxygen, sulphur, sulphinyl or sulphonyl and inert carrier.

2. A composition for controlling microorganisms selected from the group consisting of bacteria and fungi, which comprises a microbicidally effective amount of a compound as defined in claim 1, wherein B is the ethylene group, and an inert carrier compatible with said compound.

3. A composition as defined in claim 2, wherein said compound is 3-[β-(4'-chlorophenoxy)-ethyl] - 5-(β' - hydroxyethyl)-tetrahydro-1,3,5-thiadiazine-2-thione.

4. A composition as defined in claim 2, wherein said compound is 3-(β-phenoxyethyl)-5-methyl-tetrahydro-1,3,5-thiadiazine-2-thione.

5. A method for controlling microorganisms selected from the group consisting of bacteria and fungi, which comprises applying to said microorganisms a microbicidally, effective amount of a compound as defined in claim 1.

No references cited.

ALBERT T. MEYERS, Primary Examiner

D. R. ORE, Assistant Examiner

U.S. Cl. X.R.

106—15; 117—138.5, 142, 143, 147, 154; 252—8.57, 8.8, 106, 47